Sept. 24, 1935.  W. MERTÉ  2,015,491

PHOTOGRAPHIC OBJECTIVE HAVING AN IRIS DIAPHRAGM

Filed March 15, 1934

Inventor:
Willy Merté

Patented Sept. 24, 1935

2,015,491

UNITED STATES PATENT OFFICE 2,015,491

PHOTOGRAPHIC OBJECTIVE HAVING AN IRIS DIAPHRAGM

Willy Merté, Jena, Germany, assignor to the firm Carl Zeiss, Jena, Germany

Application March 15, 1934, Serial No. 715,670
In Germany March 16, 1933

1 Claim. (Cl. 95—64)

I have filed an application in Germany, March 16, 1933.

When photographic objectives, especially wide-angle objectives or objectives of great ratios of aperture, are shut down, the image projected on the focusing screen or the light-sensitive layer by the entire objective is imaged with a comparatively small aperture, contrary to which the image of the diaphragm aperture is comparatively great. Although, as a rule, the diaphragm aperture is not imaged in the plane of the focusing screen, shutting down the objective very much may entail that bright spots, so-called diaphragm spots, appear in the middle of the image on the focusing screen, these spots being sometimes rather inconvenient.

According to the invention, the said disturbing spots are neutralized to a large extent by departing from the usual practice of having the edge of the aperture always lie in one plane and providing that different apertures correspond to different planes of this edge, the plane of this edge being for instance very near a lens surface next to the diaphragm when this diaphragm is closed completely. The said improvement is realized by using an iris diaphragm in which the annular surfaces supporting the laminæ of the diaphragm are inclined relatively to the optical axis of the objective, so that these laminæ are displaceable on a convex, for instance a spherical, surface. The consequent differences of the positions of the diaphragm aperture also have a favourable influence upon the image errors and the like that depend on the ratio of aperture.

Figure 1:
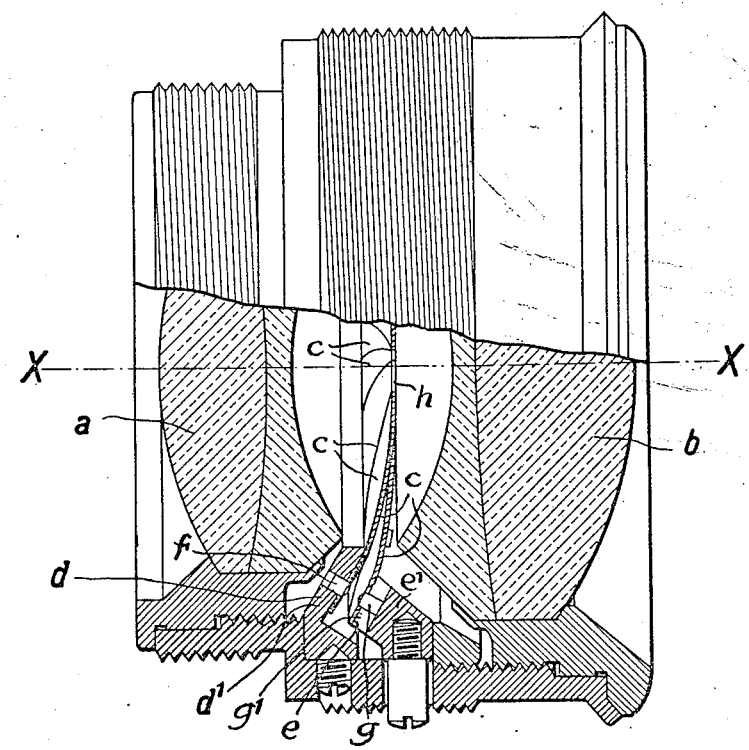
Figure 2:
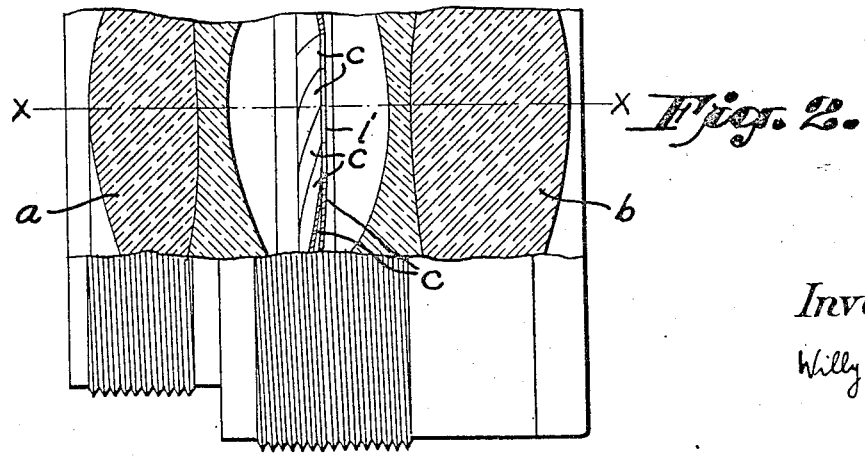

In the accompanying drawing, which illustrates the invention, Figure 1 represents in part-sectional elevation an objective containing an iris diaphragm, and Figure 2 shows in part-sectional elevation part of this objective, the iris diaphragm of the objective having in Figure 2 an aperture which is larger than the one according to Figure 1.

The diaphragm is disposed between two lenses $a$ and $b$. The laminæ $c$ of the diaphragm are attached to two conical surfaces $d$ and $e$ of annular bodies $d^1$ and $e^1$, the laminæ in the body $d^1$ being rotatable about axes $f$ and those in the body $e^1$ having bolts $g$ displaceable in a groove $g^1$. The body $e^1$ is rotatable about the axis X—X of the objective. In this construction, the laminæ represent, together, an approximately spherical surface. When adjusted according to Figures 1 and 2, the laminæ provide apertures $h$ and $i$, respectively. When the objective is stopped down very much (Figure 1), the aperture of the diaphragm lies nearer the interior surface of the lens $b$ than it does when the diaphragm is widely open (Figure 2).

I claim:

In a photographic objective an iris diaphragm, this diaphragm containing a plurality of laminæ and two annular bodies which are concentric to the optical axis of the objective and next to each other in the direction of this axis, at least one of these bodies being rotatable about the said axis, those surfaces of the two bodies which face each other being inclined relatively to the optical axis of the objective, one end of each lamina being attached to the inclined surface of one body and the other end of each lamina being attached to the inclined surface of the other body, so that rotations of the said bodies relatively to each other not only vary the aperture of the diaphragm but also displace in the direction of the optical axis the plane of the diaphragm aperture, which is at right angles to said axis.

WILLY MERTÉ.